United States Patent [19]

Singh

[11] Patent Number: 5,309,237

[45] Date of Patent: May 3, 1994

[54] APPARATUS AND METHOD OF COMPENSATING IMAGE-SEQUENCES FOR MOTION

[75] Inventor: Ajit Singh, Plainsboro, N.J.

[73] Assignee: Siemens Corporate Research, Inc., Princeton, N.J.

[21] Appl. No.: 861,414

[22] Filed: Mar. 31, 1992

[51] Int. Cl.⁵ .......................................... H04N 5/213
[52] U.S. Cl. ................................................... 348/607
[58] Field of Search ................. 358/167, 105, 166, 37, 358/36; H04N 5/213

[56] References Cited

U.S. PATENT DOCUMENTS

| | | | |
|---|---|---|---|
| 4,646,138 | 2/1987 | Willis | 358/167 X |
| 4,652,907 | 3/1987 | Fling | 358/167 X |
| 4,679,086 | 7/1987 | May | 358/167 |
| 4,717,956 | 1/1988 | Moorhead et al. | 358/135 |
| 4,727,422 | 2/1988 | Hinman | 358/133 |
| 4,875,094 | 10/1989 | Haghiri et al. | 358/105 |
| 4,890,158 | 12/1989 | Baker et al. | 358/167 X |

FOREIGN PATENT DOCUMENTS

| | | |
|---|---|---|
| 0154126 | 9/1985 | European Pat. Off. . |
| 0224957 | 6/1987 | European Pat. Off. . |
| 0285902 | 10/1988 | European Pat. Off. . |
| 0318121 | 5/1989 | European Pat. Off. . |
| 0385384 | 9/1990 | European Pat. Off. . |
| 0390660 | 10/1990 | European Pat. Off. . |
| 0414017 | 2/1991 | European Pat. Off. . |
| 9103797 | 3/1991 | PCT Int'l Appl. . |

OTHER PUBLICATIONS

"Detection and Tracking of Moving Objects by Adaptive Background Extraction", Karmann et al., The 6th Scandinavian Conference on Image Analysis, Oulu, Finland, Jun. 19-22, 1989, pp. 1051-1058.

*Primary Examiner*—Victor R. Kostak
*Attorney, Agent, or Firm*—Adel A. Ahmed

[57] ABSTRACT

The present invention apparatus and method uses a recursive filter to estimate the instantaneous intensity and temporal rate of change in intensity for object points in consecutive images of an image-sequence. The estimates of the intensity and its temporal rate of change are updated for each new image in the image sequence. The amount of smoothing introduced by the recursive filter is dependant upon the estimates computed for the intensity and temporal rate of change. As such, the recursive filter corrects the image sequence in accordance with each new set of estimates. Since motion in an image-sequence is implicit in the rate of change of intensity, the recursive filter is able to achieve motion compensated enhancements.

14 Claims, 6 Drawing Sheets

APPARATUS AND METHOD OF COMPENSATING IMAGE-SEQUENCES FOR MOTION

FIELD OF THE INVENTION

The present invention relates to a recursive motion-compensated enhancement technique for image-sequences, and more particularly to such apparatuses that perform motion compensation based on changes in image intensity without the need to explicitly compute motion from the images.

BACKGROUND OF THE INVENTION

Image sequences are used in a wide variety of applications such as satellite imaging, video communications, target tracking, automated object recognition, medical imaging and the like. In each application there is always some inherent noise present that corrupts the quality of the image sequence. The noise is unavoidably created as the image sequence is transmitted, recorded, viewed or otherwise processed. The artifacts caused by noise adversely affect every application that utilizes image sequence. For examples of how noise affects various image sequence applications, consider the following diverse applications. In satellite imaging, noise affects the resolution of the recorded images, as such noise may wash out the details of an image when the image is magnified. In video communications, noise may make an image seem blurred or out of focus to a viewer. In applications such as target tracking, the presence of noise limits the robustness of low-level visual operations, limiting the operating parameters of certain target tracking systems. Finally, in medical applications, such as X-ray fluoroscopy, the amount of noise present in the image sequence is inversely proportional to the dosage of the X-ray radiation being used. Consequently, if the amount of noise were suppressed, lower dosages of X-rays could be used.

As can be seen from the above examples, it is highly desirable to limit the amount of noise found within an image sequence. Prior art noise reduction techniques for image-sequences often use motion-compensated temporal smoothing. Temporal smoothing is performed by a low-pass filter that reduces the statistical variance of the noise. However, temporal low-pass filtering has a tendency to blur the edges of a moving image. Motion compensation is commonly used to preserve moving regions during temporal smoothing. For this purpose, the image-motion field is computed in advance for each of the frames involved in the temporal filtering. The images are then corrected using the motion field. If the image-motion field is accurate, the resulting images will not have any significant inter-frame motion, and the temporal filtering does not introduce any substantial blurring. Such motion compensation requires that extremely accurate motion fields be computed in advance. It is understood that robust and accurate real-time computation of image-motion requires a sophisticated program and a powerful, fast computer. For this reason, motion-compensated temporal smoothing is both a computationally inefficient and expensive technique. Additionally, the accurate calculating of a motion field is dependent upon its input data. If a noisy image sequence is the only input, there are theoretical limits on the accuracy of the motion field that can be computed. Because of this limit on accuracy and the computing time need to create motion fields, motion-compensated temporal smoothing has limited applicability to high noise, real-time applications, such as target tracking, X-ray fluoroscopy, etc.

Prior art motion compensation techniques for image sequence that require the computation of a motion field are exemplified in U.S. Pat. Nos. 4,727,422 to Hinman, and 4,717,956 to Moorehead et al, and European Patent Nos. 318,121A1 to Haghiri and 154,126A2 to Mussman.

Prior art references that specifically distinguish between moving and stationary objects in an image sequence are exemplified in European Patent Nos. 414,017A2 to Stiller, 385,384A2 to Karmann et al and a paper from the 6th Scandinavian Conference on Image Analysis Proceeding entitled "Detection and Tracking of Moving Objects by Adaptive Background Extraction" by Karmann et al. Finally, a technique for recursively interpolating image sequences to reduce temporal aliasing is disclosed in European Patent No. 390,660 to Phillipe et al.

The disclosed prior art techniques use motion compensation for either filtering or coding of image sequences. As such, each of the prior art techniques is computationally burdensome and inefficient. It is therefore a primary objective of the present invention to set forth a motion compensated enhancement apparatus and technique that does not compute motion and, as such, offers a reduction in the computational burden of processing an image sequence.

SUMMARY OF THE INVENTION

The present invention relates to an apparatus and method for producing motion-compensated enhancements to the images of an image sequence that help prevent blurring in the viewing of moving objects thereby removing noise in the presence of motion. The present invention method includes dividing the object points of each image in an image sequence into two regions. The first region includes all object points that have a substantially constant intensity between consecutive images. The second region includes all object points that have a substantially varying intensity between consecutive images.

A recursive filter is used to estimate the instantaneous intensity as well as the temporal rate of change in intensity for the first region. As each image in the image-sequence passes, the estimates are updated utilizing the information contained by the immediately preceding image. The amount of temporal noise smoothing introduced by the recursive filter, to the first region, is varied so to produce an intensity for a given image that is in line with the estimated intensity and temporal rate of change computed for the previous image. Since motion, in an image sequence, is implicit in the rate of change of intensity, the use of the recursive filter on the first region can compensate for effects on motion in an image sequence; thus providing the needed motion-compensated enhancements to reduce artifacts in the viewed image.

BRIEF DESCRIPTION OF THE FIGURES

For a better understanding of the present invention, reference is made to the following description of an exemplary embodiment thereof, considered in conjunction with the accompanying drawings, in which.

DETAILED DESCRIPTION OF THE PREFERRED EMBODIMENTS

Time-varied imagery is a superimposition of two distinct imaging processes. The first process relates to objects in an image sequence that have a constant, or very slowly changing, intensity. This first process is herein referred to as the "primary process". The second process related to objects in an image sequence that are characterized by a rapidly varying intensity. This second process is herein referred to as the "secondary process". To give an example of the primary and secondary processes at work, consider an typical outdoor video image sequence of a suburban scene. Qualitatively speaking, most stationary objects such as the sky, road, trees, etc. would have a relatively unaltering intensity and would comprise the primary process. Adversely, moving objects such as automobiles, moving people, windswept debris, etc. would have rapidly altering intensities and would comprise the secondary process. As a second example, consider the image sequence produced by fluoroscopy procedure performed on the heart. The soft-tissue regions of the beating heart have a low X-ray absorption rate. Catheters, dye injected blood vessels and other such opaque structures absorb high levels of X-ray quanta. As such, the soft tissue, even on a beating heart, has a substantially unaltering image intensity and comprise the primary process. Adversely, the regions such as the catheter, dye-injected blood vessels, etc. have a rapidly changing intensity on a beating heart and would comprise the secondary process. As a last theoretical example consider a black square moving against a white background. The white background has a uniform intensity and, as such, comprises the primary process. However, the interior regions of the black square also have a uniform intensity and also comprise the primary process. In this example, only the perceived boundary of the black square has a high rate of change in intensity. Therefore, only the boundary of the square comprises the secondary process.

Figure 1:
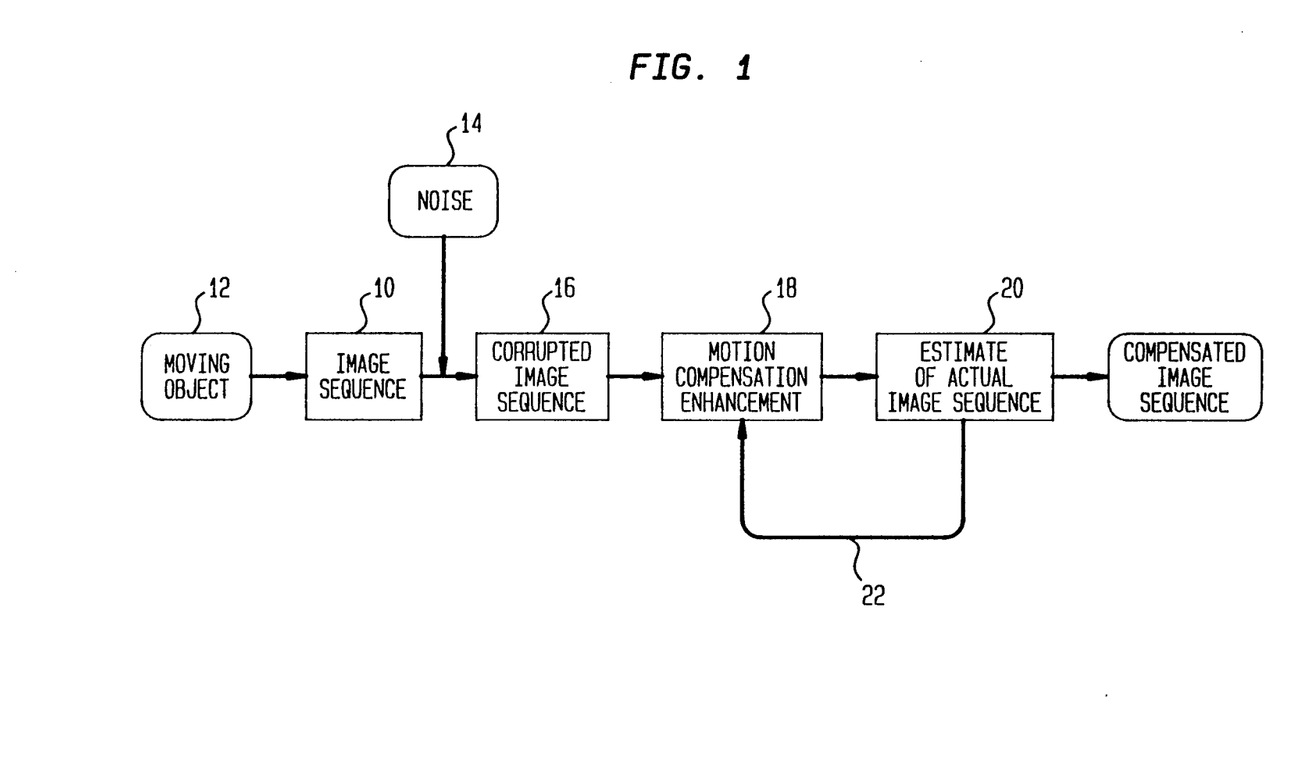
FIG. 1 is a schematic block diagram illustrating one preferred embodiment of the present invention.

Referring to FIG. 1, a block schematic showing the general operation of the present invention is shown. As can be seen, an image sequence 10 is created corresponding to an observed moving object 12. The image sequence 10 can be created by any well-known device chosen in a given application. For example, in a video communications application, the image sequence 10 may be produced by a video camera. In an X-ray fluoroscopic procedure, the image sequence 10 may be created by a fluoroscopy image intensifier. Furthermore, in satellite imaging, the image sequence 10 may be created by a telescopic camera that is remotely controlled from earth. From these examples it should be understood that the creation of the image sequence is dependent upon the application and for the purposes of the present invention the image sequence can be created by any known device.

Regardless of what moving object 12 is being tracked or how the image sequence 10 is produced it will be understood by those skilled in the art that the image sequence 10 will include some degree of noise 14. The noise 14 corrupts the image sequence 10, preventing the image sequence 10 from being a true representation of the moving object 12. Rather the noise 14 and image sequence 10 combine to create a corrupted image sequence 16. It is this corrupted sequence 16 that would be viewed if the present invention motion compensated enhancement were not used. As can be seen from FIG. 1, motion compensated enhancement 18 is performed on the corrupted image sequence 16. As will be further explained, motion compensated enhancement 18 uses a recursive filter to produce a corrected estimate 20 of the image sequence. The estimate 20 produced for each image in the image sequence, following line 22, is then used to adjust the motion compensation enhancement 20 of the subsequent image in the image sequence.

Figure 2:
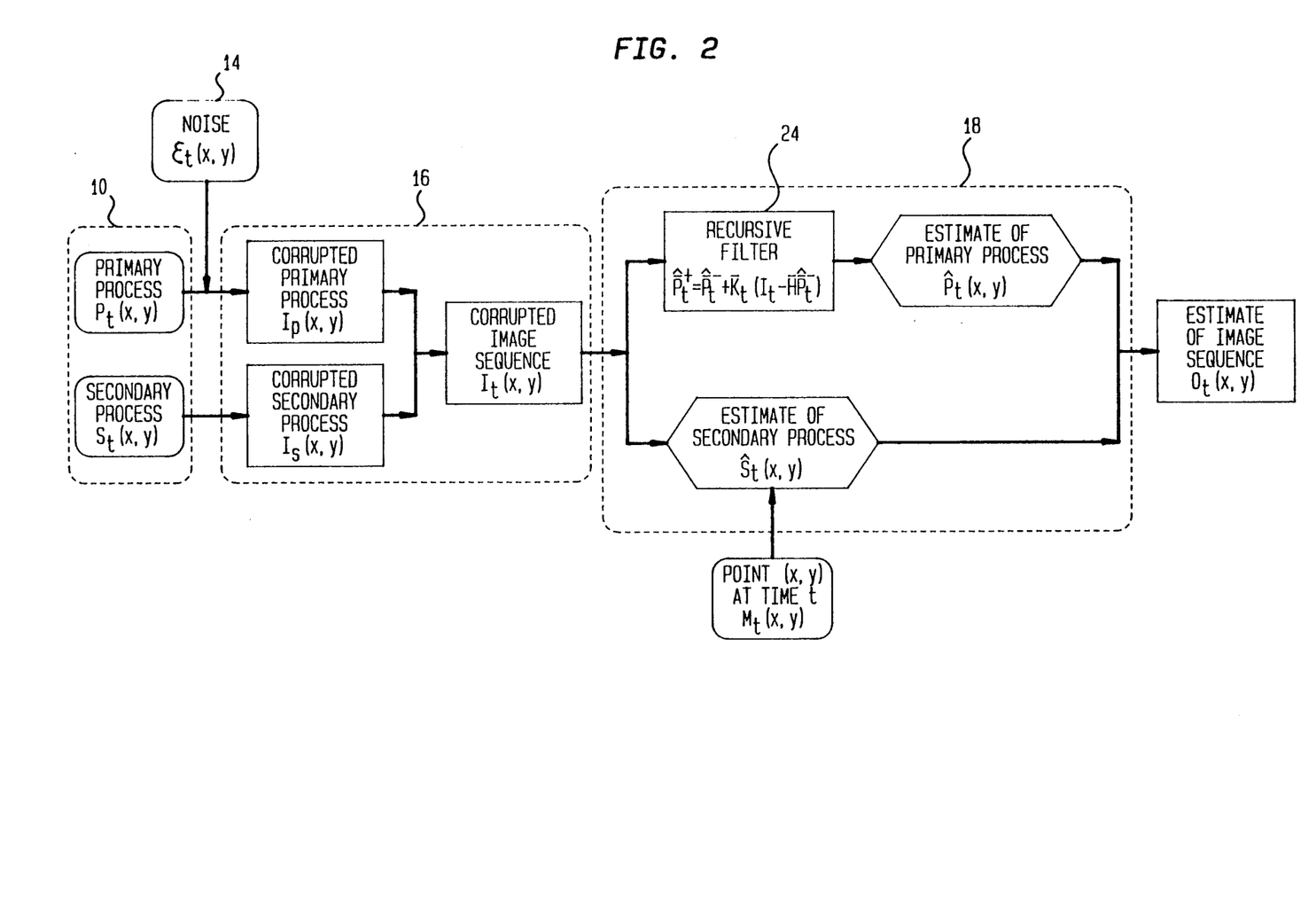
FIG. 2 is a schematic block diagram detailing the functional components shown in FIG. 1.

Referring to FIG. 2 a more detailed explanation of the present invention can be described. FIG. 2 shows a detailed block schematic of the image sequence 10, corrupted image sequence 16, motion compensated enhancement 18 and the estimate of the image sequence 20, shown in FIG. 1. In describing FIG. 2, components of the present invention will be referenced by their mathematical values to help in the understanding of the below described computations.

As has been described, all image sequences 10 are comprised of two components, the primary process $P_t(x,y)$ and the secondary process $S_t(x,y)$. However, in real life applications it should be understood that an image sequence will always include some degree of noise, represented by the variable $\zeta_t(x,y)$. The image sequence 10 can be created from any known imaging process such as video communication, fluoroscope, etc., and the noise $\zeta_t(x,y)$ in the image sequence 10 is inherently created by processes such as generating, recording, transmitting or viewing the image-sequences. In many image sequence applications such as cardiac fluoroscopy, the noise $\zeta_t(x,y)$ corrupts only the primary process $P_t(x,y)$ and leaves the state of the secondary process $S_t(x,y)$ substantially unaffected. As such, the total corrupted image-sequence $I_t(x,y)$ is comprised of the sum of the corrupted primary process $I_p(x,y)$ and the corrupted secondary process $I_s(x,y)$ In other words:

$$I_t(x,y) = I_p(x,y) + I_s(x,y) \qquad \text{Equation [1]}$$

where $$I_p(x,y) = P_t(x,y) + \zeta_t(x,y) \qquad \text{Equation [2]}$$

and $$I_s(x,y) = S_t(x,y) \qquad \text{Equation [3]}$$

In order to correct the corrupted image-sequence $I_t(x,y)$, an estimate of the uncorrupted image-sequence $O_t(x,y)$ must be obtained. This can be accomplished by computing an estimate of both the uncorrupted state of the primary process $\hat{P}_t(x,y)$ and the uncorrupted state of the secondary process $\hat{S}_t(x,y)$ and superimposing the two processes appropriately.

The estimated uncorrupted primary process $\hat{P}_t(x,y)$ is determined by the following computations. Since the computations are carried out at each pixel in the image, the coordinates (x,y) are omitted. As has been stated in Equation 3, the corrupted primary process $I_p(x,y)$ is the sum of the original primary process $P_t(x,y)$ and noise $\xi_t(x,y)$. As such:

$$I_p = P_t + \xi_t \qquad \text{Equation [4]}$$

In other words, the measurement errors (noise) $\xi_t(x,y)$ are additive. For the purposes of the present invention method, the noise $\xi_t(x,y)$ is independent and unbiased. In order to account for motion, the rate of change of intensity is added to Equation 4. Equation 4 is therefore rewritten as:

$$I_p = \overline{H}\,\overline{P}_t + \xi_t \qquad \text{Equation [5]}$$

where $\overline{H}$ is a measurement matrix given by:

$$\overline{H} = \begin{pmatrix} 1 \\ 0 \end{pmatrix}^T \qquad \text{Equation [6]}$$

and $\overline{P}_t$ is given by:

$$\overline{P}_t = \begin{pmatrix} P_t \\ \dot{P}_t \end{pmatrix}$$

where:

$$\dot{P}_t = \frac{dP}{dt}$$

To describe the evolution of $P_t$ over time, the following system model is used:

$$\overline{P}_t = \Phi\, \overline{P}_{t-1} \qquad \text{Equation [7]}$$

where $\Phi$ is a predictor matrix having the following form:

$$\Phi = \begin{pmatrix} 1 & \phi_{12} \\ 0 & \phi_{22} \end{pmatrix} \qquad \text{Equation [9]}$$

Solving Equation 4 in respect to Equation 6 it can be seen that the primary process $P_t$ is:

$$P_t = P_{t-1} + \phi_{12}\, \dot{P}_{t-1} \qquad \text{[Equation 10]}$$

and $$\dot{P}_t = \phi_{22}\, \dot{P}_{t-1} \qquad \text{[Equation 11]}$$

The choice of the parameters $\phi_{12}$ and $\phi_{22}$ determine the process dynamics. For example $\phi_{12}$ is zero, it implies a stationary primary process $P_t$ with a constant rate of change of intensity; in other words a first order system. Similarly, $\phi_{22}$ determines the manner in which $\dot{P}_t$ evolves over time. Its effects on the primary process $P_t$ are of second order; hence its exact value is less significant.

As has been stated, the secondary process $S_t(x,y)$ is assumed to be substantially uncorrupted by noise $\xi_t(x,y)$. Since the estimate of the uncorrupted image-sequence $O_t(x,y)$ is crated by superimposing the secondary process $S_t(x,y)$ and the primary process $P_t(x,y)$, and the secondary process $S_t(x,y)$ is known, all that is needed to compute the estimate of the uncorrupted image sequence $O_t(x,y)$ is to design a suitable filter 24 that corrects the primary process $P_t(x,y)$.

Figure 3:
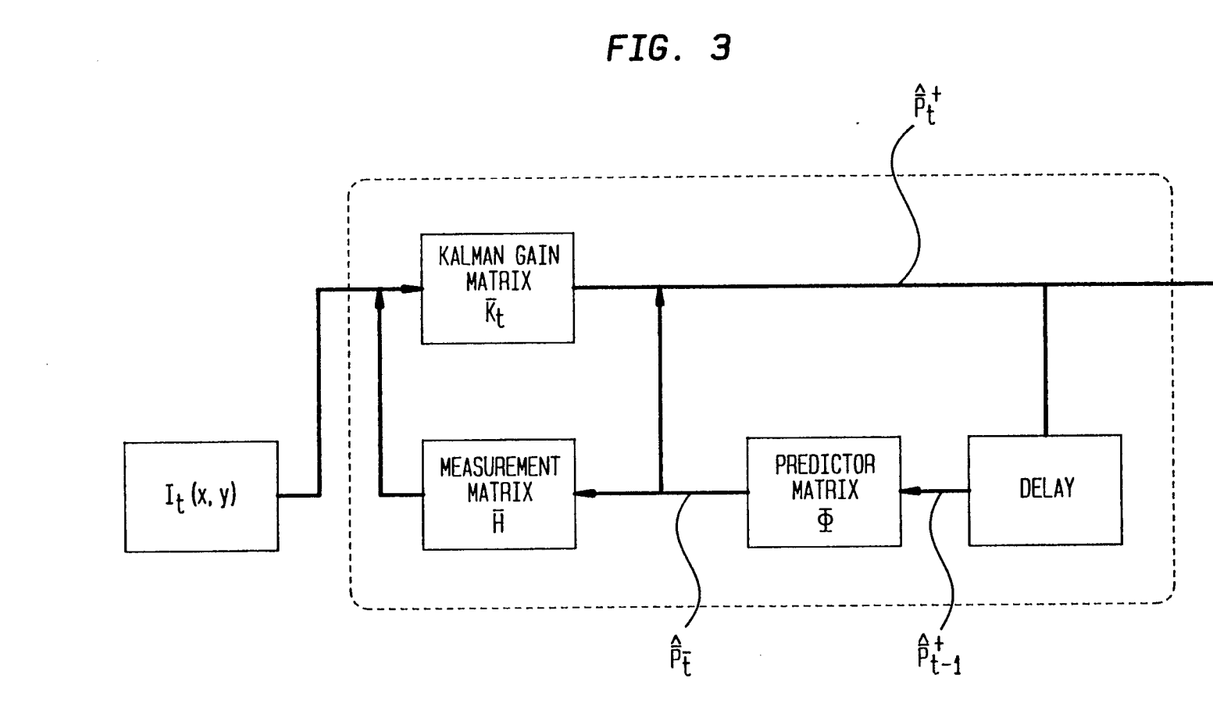
FIG. 3 is a schematic block diagram of one preferred embodiment of a recursive filter used in the present invention method.
Figure 4:
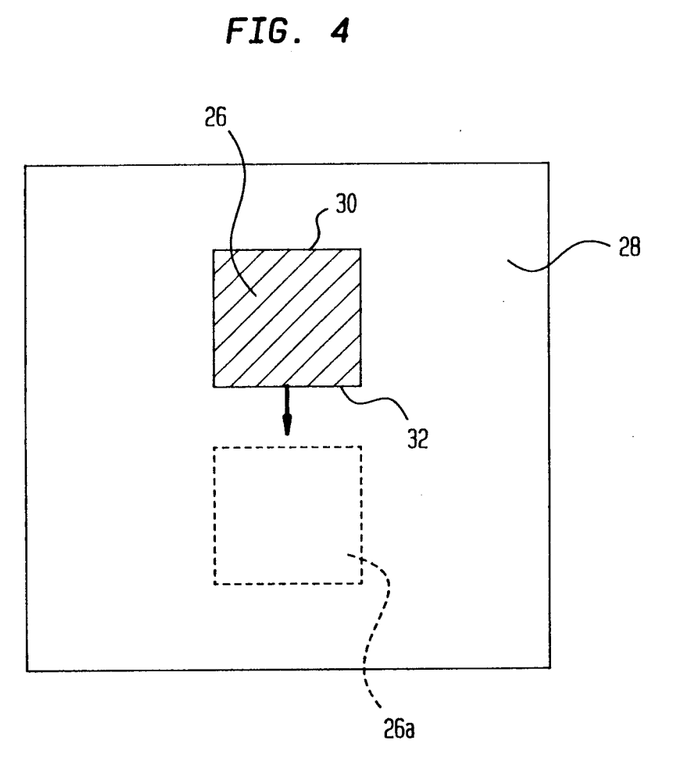
FIG. 4 shows an image sequence of a dark square moving along a light background.

The filter 24 be used to correct the primary process $P_t(x,y)$ low-pass temporary filter, preferably a Kalman filter. The Kalman filter is well known in the art and was first described in "A New Approach to Linear Filtering and Prediction Problems" by R. F. Kalman, Journal of Basic Engineering, pages 35–46, March 1960. Using the measurement model of Equation 4, in conjunction with the system model of Equation 7, a Kalman filter 24 can be used to estimate $P_t$ in a recursive fashion. In FIG. 3 a block schematic of such a Kalman filter 24 is shown. Utilizing the Kalman filter 24 the recursive estimate $\hat{P}_t$ of $P_t$ is given by:

$$\hat{\overline{P}}_t^+ = \hat{\overline{P}}_t^- + \overline{K}_t (I_t - \overline{H}\,\hat{\overline{P}}_t^-) \qquad \text{Equation [12]}$$

where $$\hat{\overline{P}}_t^- = \Phi\, \hat{\overline{P}}_{t-1}^+ \qquad \text{Equation [13]}$$

The optimal value of the Kalman gain matrix $K_t$ can be computed using the covariance matrices of measurement noise. However, preferably a heuristic formulation of the Kalman gain matrix $K_t$ is used where:

$$\overline{K}_t = \begin{pmatrix} K_t \\ K_t \end{pmatrix} \qquad \text{Equation [14]}$$

and $$K_t = \alpha M_t + \beta(1 - M_t)$$

where $\alpha$ and $\beta$ are formed from the interval [0,1] and $M_t$ is a logical variable, corresponding to a point on a frame of the image sequence, and showing the presence of the secondary process $S_t(x,y)$ at the point (x,y) and a time (t). The value of the Kalman gain is $\alpha$ if the secondary process $S_t(x,y)$ is active. If the secondary process $S_t(x,y)$ is not active the value of the Kalman gain is $\beta$. As such, it is preferred that $\alpha$ be larger than $\beta$ so that smoothing is suppressed when the secondary process $S_t(x,y)$ is active. As should be now apparent, the recursive Kalman filter 24 estimates both the instantaneous intensity, as well as its temporal rate of change. Both estimates are updated when a new image is acquired, as is shown by line 22 in FIG. 1. As such, the amount of smoothing introduced by the Kalman filter 24 depends both on intensity and its temporal rate of change.

With the corrected estimate of the primary process $\hat{P}_t(x,y)$ computed, the corrected estimate of the secondary process $\hat{S}_t(x,y)$ needs to be calculated before both values can be superimposed to obtain the estimate of the entire image-sequence $O_t(x,y)$. The secondary process $S_t(x,y)$ is substantially uncorrupted. As such, the estimated value of the secondary process $\hat{S}_t(x,y)$ is obtained in a straightforward manner where:

$$\hat{S}_t = I_t \times M_t \qquad \text{Equation [15]}$$

As has been previously mentioned $M_t$ is the logical variable corresponding to the presence of the secondary process $S_t(x,y)$ at point (x,y) and at time (t). A simplistic algorithm to compute the logical variable $M_t$ is:

$$M_t = \begin{cases} 1 & \text{if } I_t - \hat{P}_t^- \geq T_m \\ 0 & \text{if } I_t - \hat{P}_t^- < T_m \end{cases} \quad \text{Equation [16]}$$

where $T_m$ is the suitable threshold value. However, using threshold value $T_m$ tends to include much of the noise in the imagery of the secondary process $S_t(x,y)$. By making use of the spatial coherence of motion to discriminate between the true secondary process $S_t(x,y)$ and noise, it can be computed that:

$$D_t = |I_t - \hat{P}^-_t| \quad \text{Equation [17]}$$

for each pixel in a small spatial neighborhood of (x,y). The variance of $D_t$ in this neighborhood is used to compute the variable $M_t$, where:

$$M_t = \begin{cases} 1 & \text{if } I_t - P_t^- \geq T_m \text{ and var }(D_t) \leq T_v \\ 0 & \text{otherwise} \end{cases} \quad \text{Equation [18]}$$

and where $T_m$ and $T_v$ are suitably chosen thresholds. With the estimated values for the primary process $\hat{P}_t(x,y)$ and the secondary process $\hat{S}_t(x,y)$ in hand, the corrected estimate of the overall image sequence $O_t(x,y)$ is computed by superimposing the two values.

The effect of the Kalman filter 24 on the primary process $P_t(x,y)$ is that of motion-compensated temporal smoothing. As has been previously described, Equation 12 represents a low-pass temporal filter. Hence, the effect of the filter expressed by Equation 12 is that of temporal smoothing. Additionally, as is shown in Equation 13

$$\hat{P}_t^- = \Phi \hat{P}^+_{t-1}$$

using the definition of $\Phi$ found in Equation 9, it can be inferred from Equation 13 that:

$$\hat{P}^-_t = \hat{P}^+_{t-1} + \Phi_{12} \hat{P}^+_{t-1}$$

where $\Phi_{12} \hat{P}^+_{t-1}$ represents the expected change in intensity resulting from interframe motion during the time interval between (t−1) and t. Consequently, the state of the primary process $P_t(x,y)$ in the previous frame is compensated, in regard to motion effects, before it is used in filtering.

As should now be apparent, the estimated corrected value of the primary process $P_t(x,y)$ is computed from the corrupted image sequence $I_t(x,y)$ utilizing equations [1] through [14]. Similarly, the estimated corrected value of the secondary process $\hat{S}_t(x,y)$ is computed from the corrupted image sequence $I_t(x,y)$ utilizing equation [15]. The value of $M_t(x,y)$, needed to calculate the estimates of the primary process $\hat{P}_t(x,y)$ and the secondary process $\hat{S}_t(x,y)$, is computed utilizing equations [16] through [18]. Finally, based on the value of $M_t(x,y)$, the estimates of the primary process $\hat{P}_t(x,y)$ and the secondary process $\hat{S}_t(x,y)$ are superimposed to obtain the estimate of the corrected image sequence $O_t(x,y)$.

Since both the estimate of the primary process $\hat{P}_t(x,y)$ and the secondary process $\hat{S}_t(x,y)$ are computed as a function of $M_t(x,y)$, both the estimate of the primary process $\hat{P}_t(x,y)$ and the secondary process $\hat{S}_t(x,y)$ are reestimated for each new image frame $M_t(x,y)$. As such, the recursive filter corrects the image sequence in accordance with each new set of estimates and is able to achieve the desired motion compensated enhancements.

EXAMPLE

The present invention image-sequence motion-compensation method is applied to an image-sequence wherein a shaded square is viewed against a background. Referring to FIG. 3 there is shown the square 26, at frame 1, placed upon a background 28. The image sequence used consists of 15 frames, having a 128×128 pixel resolution. In this experiment the square 26 is dark relative to the background 28. After the fifteen frames have lapsed, the square 26 will move from its shown original position to the position of the second square 26a, shown with hidden lines. The intensity of the background 28 is constant (held at 128) and the intensity of the square increases linearly from zero at its upper edge 30 to twenty at its lower edge 32. In other words, the vertical gradient of intensity for the square 26 is 0.5/pixel, and the horizontal gradient is 0.0/pixel. The square 26 moves one pixel per frame in the direction of its lower edge 32. The values of various outside parameters are chosen as follows: $\alpha = 0.50$, $\beta = 0.005$, $\Phi_{12} = 0.500$, $\Phi_{22} = 1.0$, $T_m = 15$ and $T_v = 5$.

Two image sequences are obtained from the ideal sequence, described above, by adding zero-mean Gaussian noise with a variance of ten and thirty, respectively, to each frame of the original sequence. These sequences are herein referred to as Sequence-1 and Sequence-2, respectively.

Figure 5:
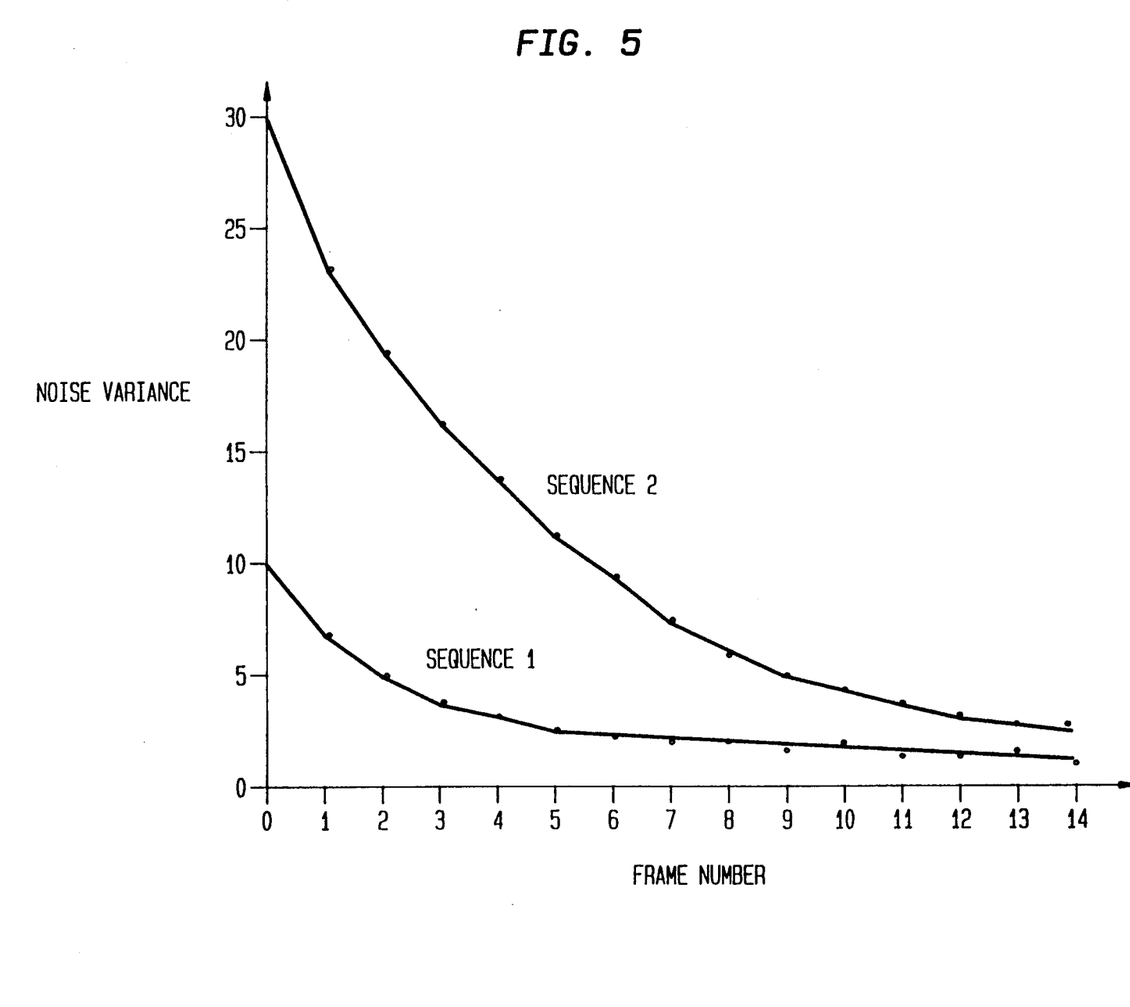
FIG. 5 is a graph showing noise variance vs frame number for the present invention's effect on the image sequence of FIG. 4.

The previously described enhancement computations are conducted on each sequence image and the post-filtering noise-variance is calculated at each frame, over the entire image. Referring to FIG. 5 a graph is shown plotting Sequence-1 and Sequence-2 as a function of post-filtering noise variance and time. As can be seen from FIG. 5, the noise-variance reduces as the number of frames increases. Additionally, the greater the noise, the longer it takes for the quality of the image to reach an acceptable level where the post-filtering noise-variance falls below a specified threshold.

In the present experiment the background 28 is included in the primary process $P_t(x,y)$ because the background 28 has a constant intensity. The interior region of the square 26 is also included in the primary process $P_t(x,y)$ Barring the noise effects, the temporal variation of intensity inside the square 26 can be modeled using the computation of Equation 13. Additionally, the regions immediately proximate the upper edge 30 and the lower edge 32 of the square 26 are included in the secondary process $S_t(x,y)$, because of the underlying discontinuity in intensity inherent with movement. It should be noted, however, that the vertical edges of the square 26 are included in the primary process. This is because the intensity discontinuity is along the direction of motion and does not violate the model of Equation 13.

Figure 6A:
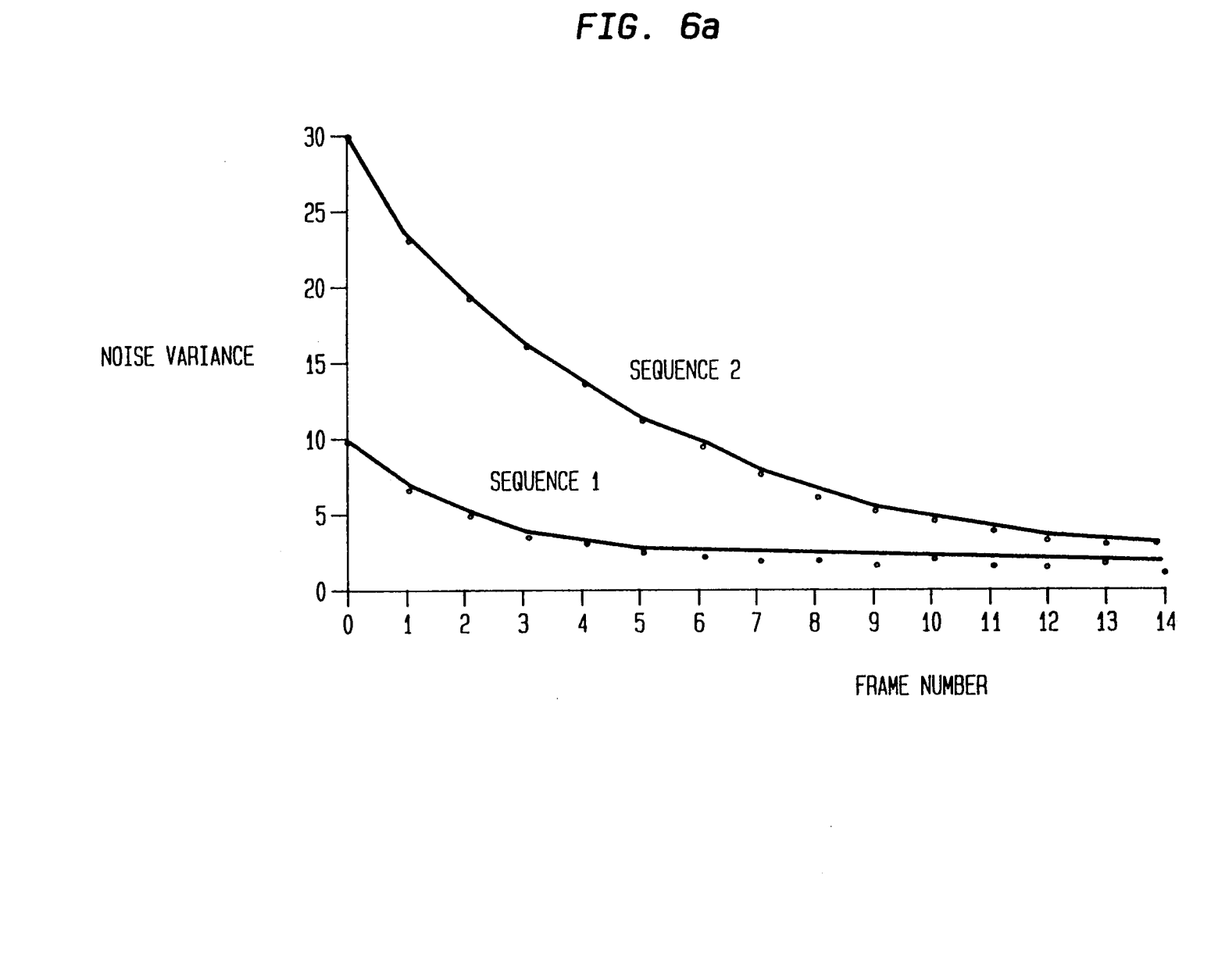
FIG. 6a is a graph showing noise variance vs frame member for the primary process of the present invention when applied to the image sequence of FIG. 4.
Figure 6B:
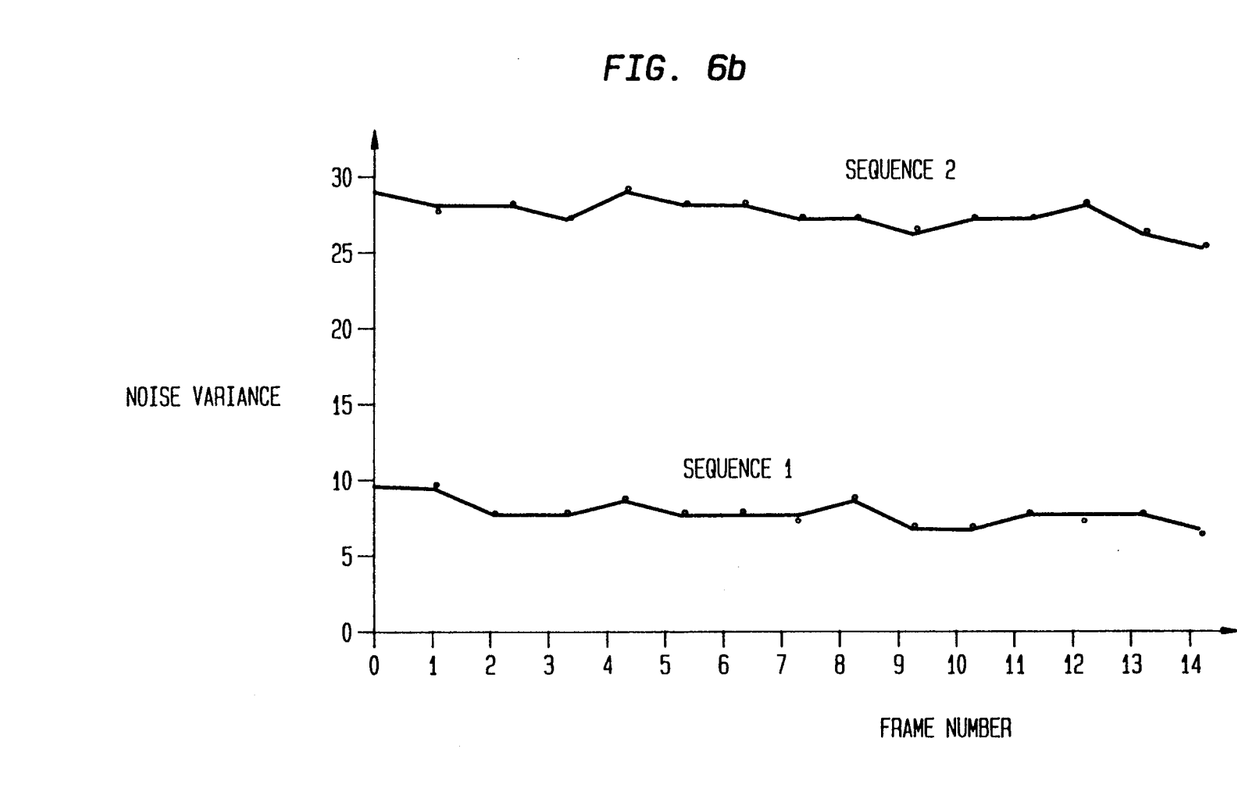
FIG. 6b is a graph showing noise variance vs frame number for the secondary process of the present invention when applied to the image sequence of FIG. 4.

In order to compare the performance of the present invention method in the regions of the primary process $P_t(x,y)$ and the secondary process $S_t(x,y)$, the post-filtering noise-variance is computed separately over all the pixels where $M_t = 0$ and the pixels where $M_t = 1$. Referring to FIGS. 6a and 6b, Sequence-1 and Sequence-2 are shown for both the primary process $P_t(x,y)$ and the secondary process $S_t(x,y)$, respectively. As is apparent from comparing FIGS. 6a and 6b, the regions represented by the primary process $P_t(x,y)$ have a noise-variance that reduces with the increase in frames. For the regions represented by the secondary process $S_f(x,y)$, the noise remains substantially unaffected by the filtering.

The present invention motion-compensation method uses a low pass temporal filter to estimate the instantaneous intensity and temporal rate of change of individual images in an image sequence. The amount of motion-compensated smoothing introduced by the filter depends on the temporal rate of change of intensity. Since motion is implicit in the rate of change of intensity, the filter is able to achieve the effects of the motion compensation. Because of its recursive nature, the present inventive method needs to store only the most recent filtered image and its temporal rate of change. Explicit computation of motion-fields is not required. This minimizes the memory required, and increases computational efficiency.

It should be understood that the embodiment described herein is merely exemplary and that a person skilled in the art may make variations and modifications without department from the spirit and scope of the invention. More particularly, it should be understood that in view of the exemplary embodiment described, a person skilled in the art can construct a motion compensated enhancement device for substantially any given application that utilizes a image sequence. Any such device or variations and modifications to the embodiment and method described are intended to be included within the scope of the invention as defined in the appended claims.

What is claimed is:

1. In an apparatus that utilizes an image sequence, a device for producing motion compensated enhancement for object points contained within the individual images of said image sequence, comprising:
   an estimating means, including a recursive filter, for estimating an instantaneous intensity and a temporal rate of change of intensity for said object points; and
   an adjusting means for adjusting said recursive filter after each image in said image sequence, according to said intensity and said temporal rate of change as estimated by said estimating means, for an immediately preceding image in said image sequence to thereby compensate said image by substantially removing noise in the presence of motion.

2. The device of claim 1 further including a dividing means for dividing said object points contained within the individual images of said image sequence into two regions, a first region wherein the intensity of said object points remain substantially unchanged between consecutive images, and a second region wherein the intensity of said object points varies between consecutive images, said estimating means, estimating said instantaneous intensity and said temporal rate of change for said object points in said first region.

3. The device of claim 2 further including a superimposing means for superimposing said first region and said second region after said instantaneous intensity and said temporal rate of change have been estimated for said object points in said first region.

4. The device of claim 3 wherein said recursive filter means includes a low-pass temporal filter.

5. The device of claim 3 wherein said recursive filter means includes a Kalman filter.

6. In an apparatus that utilizes an image sequence that contains images corrupted by noise, a device for reducing said noise in said images, comprising:
   an estimating means for estimating said noise in each said image of said image sequence, wherein said estimating means estimates an instantaneous intensity and a temporal rate of change of intensity for object points contained in each said image of said image sequence; and
   an adjustable recursive filter means for filtering said noise in each said image according to the value of said noise as estimated by said estimating means, for an immediately preceding image in said image sequence to thereby compensate said image by substantially removing noise in the presence of motion.

7. The device of claim 6 wherein said recursive filter includes a low-pass temporal filter.

8. The device of claim 6 wherein said recursive filter includes a Kalman filter.

9. The device of claim 8 further including a dividing means for dividing said object points, contained within each said image, into two regions, a first region wherein the intensity of said object points remain substantially unchanged between consecutive images, and a second region wherein the intensity of said object points vary between consecutive images, said recursive filter means filtering said noise form said first region.

10. The device of claim 9 further including a superimposing means for superimposing said first region and said second region after said first region has been filtered by said recursive filter means.

11. A method for providing motion-compensated enhancement for object points contained within each image of an image-sequence corrupted by noise, comprising the steps of:
   separating said object points in said image-sequence into two regions, a second region wherein the intensity of said object points vary substantially between consecutive images and a first region wherein the intensity of said object points, between consecutive images, varies slowly relative to said second region;
   estimating an instantaneous intensity and a temporal rate of change in intensity for said object points in each said image of said image sequence and estimating the amount of noise in said first region of each said image, using a recursive filter; and
   adjusting the amount of noise reduction introduced by said recursive filter to said first region of a given image according to the amount of noise estimated for an immediately preceding image in said image sequence.

12. The method of claim 11 further including the step of superimposing said first region and said second region after said step of adjusting the amount of noise reduction introduced by said recursive filter.

13. The method of claim 12 wherein said recursive filter includes a low-pass temporal filter.

14. The method of claim 13 wherein said recursive filter includes a Kalman filter.

* * * * *